United States Patent [19]
Arnberg et al.

[11] Patent Number: 5,440,923
[45] Date of Patent: Aug. 15, 1995

[54] DRIVABLE SLOPE-SENSITIVE UNIT FOR MEASURING CURVATURE AND CROSSFALL OF GROUND SURFACES

[75] Inventors: Peter W. Arnberg, Stockholm; Roland Östergren, Linköping, both of Sweden

[73] Assignee: RST Sweden AB, Solna, Sweden

[21] Appl. No.: 74,862

[22] Filed: Jun. 10, 1993

[30] Foreign Application Priority Data

Dec. 12, 1990 [SE] Sweden .............................. 90039769

[51] Int. Cl.⁶ .............................................. G01B 7/00
[52] U.S. Cl. ........................................ 73/146; 33/521; 33/341; 33/366
[58] Field of Search ................... 73/146; 33/1 Q, 287, 33/338, 651, 651.1, 318, 340, 341, 366, 521, 523, 523.1, 523.2

[56] References Cited

U.S. PATENT DOCUMENTS

| | | |
|---|---|---|
| 3,797,124 | 3/1974 | Easterling et al. ............... 33/331 |
| 4,653,316 | 3/1987 | Fukuhara ........................ 73/146 |
| 4,674,327 | 6/1987 | Swindall et al. ................. 73/146 |
| 4,741,207 | 5/1988 | Spangler ......................... 73/146 |
| 4,896,964 | 1/1990 | Kitazume ...................... 73/146 X |
| 4,899,296 | 2/1990 | Khattak ....................... 73/146 X |

FOREIGN PATENT DOCUMENTS 0085924 8/1983 European Pat. Off.

*Primary Examiner*—Richard E. Chilcot, Jr.
*Assistant Examiner*—Joseph L. Felber
*Attorney, Agent, or Firm*—Christie, Parker & Hale

[57] ABSTRACT

A method and an apparatus for measuring the curvature and the slope of ground surfaces in two different directions are disclosed. Use is made of a drivable slope-sensitive unit which emits electric signals relating to the crossfall, the hilliness, the horizontal curvature, and the covered road stretch and/or the velocity, by means of two electronic angle sensors for measuring the inclination in the vertical direction. According to the invention, the acceleration or deceleration in the direction of travel of the vehicle, the velocity, and the covered road stretch are measured by a pulse means provided in a nondriving wheel of the drivable unit and by a velocity measuring unit, the inclination of the vehicle relative to the plane through its ruts and or relative to the plane of the roadway is measured by laser ranging units, and a continuous zero-point monitoring and calibration, respectively, of the angular-velocity gyro are performed by a compass.

10 Claims, 2 Drawing Sheets

DRIVABLE SLOPE-SENSITIVE UNIT FOR MEASURING CURVATURE AND CROSSFALL OF GROUND SURFACES

BACKGROUND OF THE INVENTION

The present invention relates to an apparatus and a method for measuring the curvature and the slope of ground surfaces in two different directions by means of a drivable unit.

Researchers and people responsible for road maintenance need information especially on the crossfall, the curvature and the hilliness of roads to be able to take relevant steps e.g. in respect of public road repairs and maintenance to obtain maximum cost efficiency. Correct road maintenance means optimum bearing strength of the road and a minimum of traffic perils and environmental problems. Such optimum maintenance efficiency requires direct information on the crossfall, the curvature and the hilliness, as well as information which can be indirectly obtained by using these variables for drawing maps so as to make it easier to locate all the variables measured, e.g. road-surface variables. By simultaneous measuring, variables can be linked together, making it possible, for instance, to establish the risks of aquaplaning at the end of a slope, in the presence of ruts and a slight crossfall, possibly also with small texture, increasing such risks.

In road measuring contexts, such information may prove highly profitable, not only for acquiring more knowledge in view of road maintenance, but also for monitoring newly-built surfaces and providing basic data for contracts in connection with the planning and construction of roads.

Since all paved roads in Sweden are now measured regularly, the new variables provided by the present invention can be measured without any substantial additional costs. Thus, the economic benefits of the invention are more appreciable.

U.S. Pat No. 3,797,124 discloses a slope-measuring device which is especially designed for measuring the roadway inclination in the longitudinal and the transverse direction and which has an electric slope-sensitive unit with a slope-sensitive pendulum suspended freely swinging in the slope-measuring direction, i.e. an inclinometer. When the inclinometer is tilted sideways, e.g. owing to the crossfall of the road, the pendulum tends to move in the direction of the crossfall, and the movement is converted by a sensor into an electric signal.

European Patent Application 83100872.7 now European Patent No. 85924 discloses a measuring device which is especially designed for measuring the roadway inclination in the longitudinal and the transverse direction by means of an electric slope-sensitive unit. This unit has a slope-sensitive pendulum suspended freely swinging in the slope-measuring direction and is connected to an indicating unit with a differential transformer whose movable core forms the slope-sensitive pendulum and which is connected to an additional transformer which, by transistors, converts the pendulum movements into proportional electric signals.

Such modern electronic angle sensors or inclinometers measure the angle to the horizontal plane, provided that they are subjected only to the force of gravity. Thus, the angles of inclination can only be correctly measured under fairly static conditions. If mounted in vehicles driven in normal traffic, inclinometers of this type are exposed to forces of acceleration caused by the movements of the vehicle. Thus, this makes a contribution to the output signals by accelerations and decelerations caused by depressing the accelerator or braking, cornering and so forth.

It is known to employ gyro systems which, as output signals give angles to the horizontal plane for determining the horizontal curvature, the vertical curvature and the crossfall. However, gyro-based systems have their deficiencies, such as complicated handling procedures, a great need of attendance and maintenance, sensitivity to external influence and high initial costs, or alternatively poor accuracy.

SUMMARY OF THE INVENTION

An object of the invention is to improve prior-art apparatus and methods for measuring ground surfaces, especially the horizontal curvature, the vertical curvature, the crossfall and, in the event of map drawing, also the road position coordinates.

This object is achieved in an apparatus of the type stated in the introduction to this specification, and a method in accordance therewith.

According to the invention, a measuring vehicle is equipped with two inclinometers, one in the direction of travel of the vehicle, i.e. the X-direction, for measuring the inclination of the ground in the X-Z plane where (z represents the vertical direction), and one in the Y-direction of the vehicle for measuring the transverse inclination or crossfall in the Y-Z plane. There is further provided an angular-velocity gyro, also termed rate gyro, with its measuring axis in the Z-direction. Also, for determining the velocity as well as the X-acceleration and the X acceleration of the vehicle, a pulse means is mounted in a nondriving wheel.

To compensate for lateral swaying of the vehicle, the inclination of the vehicle relative to the plane through the ruts is measured by two laser ranging units, each measuring the distance down to a rut. Subtraction of the measured values provides a value of the inclination in one or the other direction. There is further provided an angular-velocity gyro (rate gyro) with its measuring direction in the vertical direction (the Z-direction). In cornering the rate gyro emits a signal $\omega_z$ rad/s. Assuming that the curve radius is R m and the velocity is v m/s then $\omega_z \cdot R = v$ or $\omega_{z/v} = 1/R$ (1/m). Straight road stretches then give the value 0, and the curve radii are defined in the vehicle-related plane X Y.

Assuming that the rut depths to the left and to the right can be measured correctly, which presupposes that the outer laser ranging units reach out to measure ground surface without ruts, a relationship can be established between, on the one hand, the angle between the horizontal plane and the plane of the unloaded road surface and, on the other hand, the horizontal plane and the plane through the ruts. In cornering, lateral acceleration arises, which affects the Y inclinometer by an additive contribution and, above all, causes the vehicle to sway, thereby creating another source of error. If the Y inclinometer gives the angle $\gamma$, the actual crossfall can be obtained by $\alpha = \gamma + k \cdot H \, V$, $\alpha$ being the actual crossfall, $\gamma$ being the deflection of the inclinometer in radians, and k being the dependence of the deflection of the inclinometer on the lateral acceleration in radians per m per second squared (rad/m/s²). The lateral acceleration $a_y$ is obtained according to the equation $a_y = v^2/R$, v being the velocity of the vehicle (m/s), and R being the curve radius (m), which according to the above formula gives $a_y = v \cdot \omega$; $\omega$ being the signal angular velocity (r/s) of the rate gyro.

The pulse means provided in the non-driving wheel emits a certain number of pulses per revolution of the wheel, e.g. 2500 pulses per revolution.

A given number of pulses corresponds to, e.g., 2 m of travelled or covered road stretch. The time between the distance covered is established and serves to determine both the velocity and the acceleration/deceleration. If the measured value for this time, when subtracting the time between two such covered road stretches from the preceding corresponding value, is negative, there is a deceleration. If it is positive, there is acceleration. The magnitude of the value indicates the size of the deceleration/acceleration. The acceleration or deceleration value is used as a correction for the angle, obtained with the inclinometer in the direction of travel (the X-direction), to the horizontal plane, i.e. the gradient of the roadway in the direction of travel. Also the road stretch covered can be recorded on the basis of the number of pulses, and the thus-obtained measured values are related to the position on a longer stretch of road.

The horizontal curvature is obtained on the basis of the angular-velocity information supplied by the rate gyro, and the velocity of the vehicle. Dividing the value from the rate gyro by the velocity of the vehicle gives the horizontal curvature, which is reciprocal to the curve radius. The curvature of a straight road is 0, since the radius then is endless.

The inclinometer measuring in the transverse direction of the vehicle (the Y-direction) senses the lateral inclination of the vehicle body. The Y-inclinometer is sensitive to lateral acceleration in cornering. The centripetal acceleration can be derived from the measured value of the rate gyro and the velocity value, and be subtracted from the measured value of the inclinometer. The results depend on the crossfall of a straight road or the superelevation in a curve. In addition, correction for the swaying of the vehicle body must be performed.

It has been found that also an angular-velocity gyro gives rise to certain errors which, by the addition of measuring errors that can be added or subtracted, may cause incorrect indications, and the invention therefore includes an electronic compass for continuous zero-point monitoring and calibration of the angular-velocity gyro. For instance, a mean value of the supplied values of the angular-velocity gyro during the latest 100,000 pulses from the pulse means should, theoretically, correspond to another mean value derived from the values provided by the electronic compass during the same period of time. If no such correspondence exists, a correction is performed. Since also a compass may provide incorrect measured values owing to local deviation, it is suggested, according to the invention, that also this deviation is used for correcting the measured values supplied by the compass.

BRIEF DESCRIPTION OF THE DRAWINGS

For exemplifying purposes, the invention will be described in more detail below with the reference to the accompanying drawings, in which.

DETAILED DESCRIPTION

Figure 1:
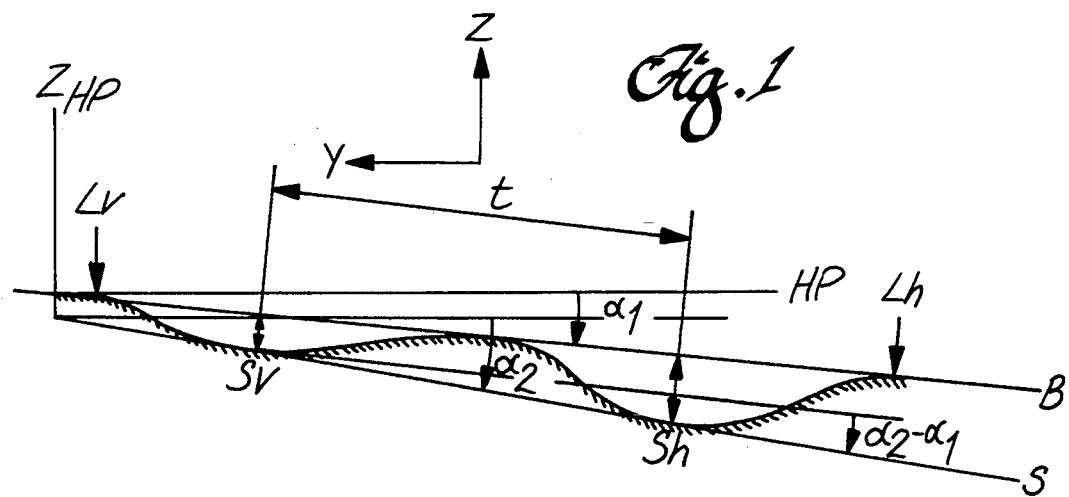
FIG. 1 is a vertical section of half a roadway with positive crossfall.
Figure 2:
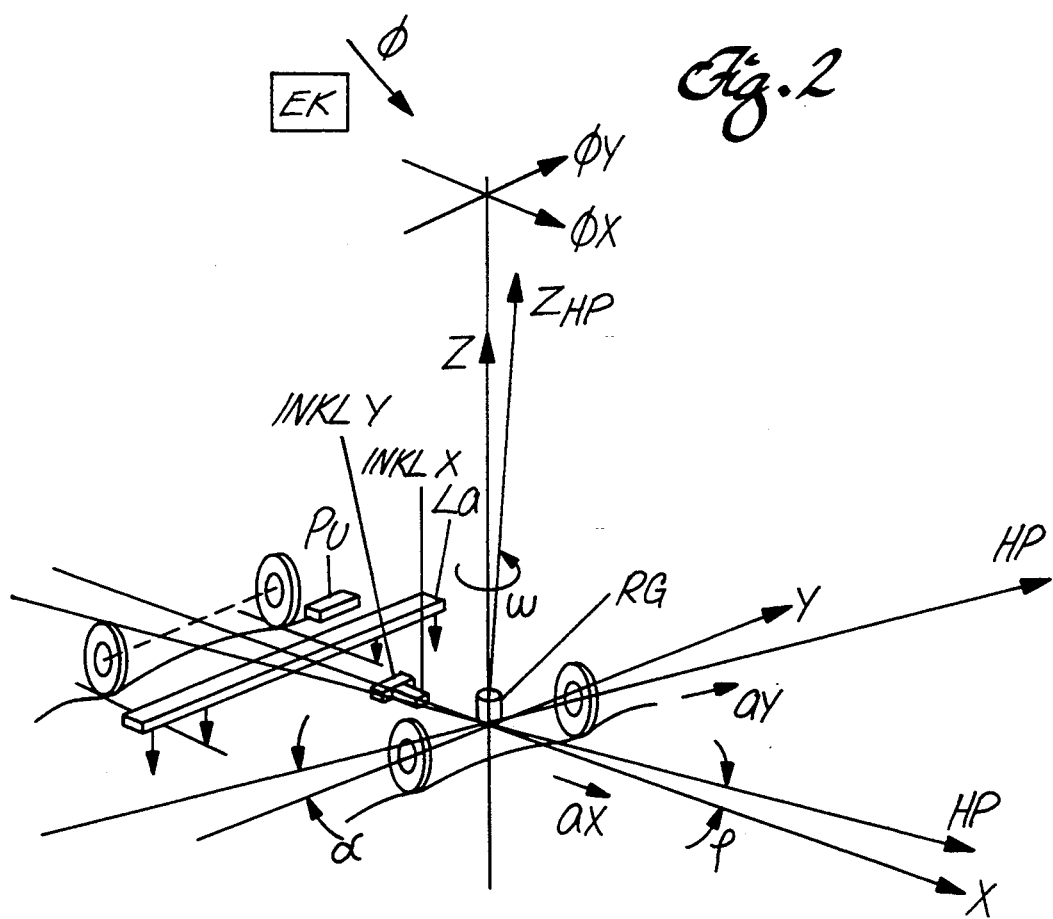
FIG. 2 is a basic outline showing a schematically indicated measuring vehicle to which the invention is applied.

FIG. 1 is a section of a roadway, the left side in the Figure being closest to the middle, of the road and the right side in the Figure being closest to the right verge of the road. The arrow X indicates the direction of travel (FIG. 2). The arrow Z indicates the vertical direction, and the arrow Y indicates a direction transverse to the direction of travel. Further, $\alpha_1$ designates the gradient of the roadway (superelevation) relative to the direction HP (FIG.2) and $\alpha_2$ designates the inclination a plane S through ruts in the roadway caused by wear. (The plane HP is shown in FIG. 1 as a line because the plane is perpendicular to the page.) Since the depth sh of the rut to the right in FIG. 1 is greater than the depth sv of the rut to the left, the vehicle will come to be positioned at an angle of inclination nation $\alpha_2 - \alpha_1$ to the roadway B in the transverse direction. For small values of $\alpha_1$ and $\alpha_2$, $\alpha_2 - \alpha_1 = (sh-sv)xt$, t being the center distance between the wheels of the vehicle transversely of the direction of travel. Cornering results in lateral acceleration which affects the associated inclinometer by an additive contribution, but also causes the vehicle to sway. By measuring the distance to the ground by means of two laser ranging units Lv and Lh to the left and to the right of the ruts, it is possible to obtain a value for the swaying of the vehicle relative to the roadway B. BY measuring the same distance in the ruts sv and sh, it is possible to obtain a value for the swaying of the vehicle relative to the plane S through the ruts.

In FIG. 2, the four wheels of the measuring vehicle are indicated, but have not been given any reference numbers. In the vehicle are mounted an inclinometer INKL X for measuring the inclination $\phi$ of the vehicle relative to the horizontal plane HP, as well as an inclinometer INKL Y for measuring the inclination $\alpha$ of the vehicle in the transverse direction relative to the horizontal plane HP. There is further provided an angular-velocity measuring device or rate gyro RG with its measuring axis in the Z-direction. An electronic compass EK measuring the angle $\phi x$ in the direction of travel X and the angle $\phi y$ in the transverse direction Y of the vehicle is arranged for monitoring and calibrating the angular-velocity gyro RG. A laser measuring beam La is further arranged for measuring the distance down to the unrutted surface and also down to the ruts to the right and to the left (cf. FIG. 1). Moreover, a pulse means Pu, which is disposed in a nondriven wheel, serves to measure the acceleration/deceleration in the direction of travel of the vehicle, as well as the road stretch covered i.e. the distance. The horizontal plane is indicated by two arrows HP. The measured angle $\phi$ between the horizontal plane and the direction of travel indicates the hilliness of the road, i.e., slope and rise, respectively, in the direction of travel, while $\alpha$ indicates the angle between the horizontal plane HP and the plane through the ruts of the measuring vehicle. Measurements are also made of the accelerations $a_y$ in the transverse direction in cornering and $a_x$ in the direction of travel, caused by acceleration and deceleration.

Figure 3:
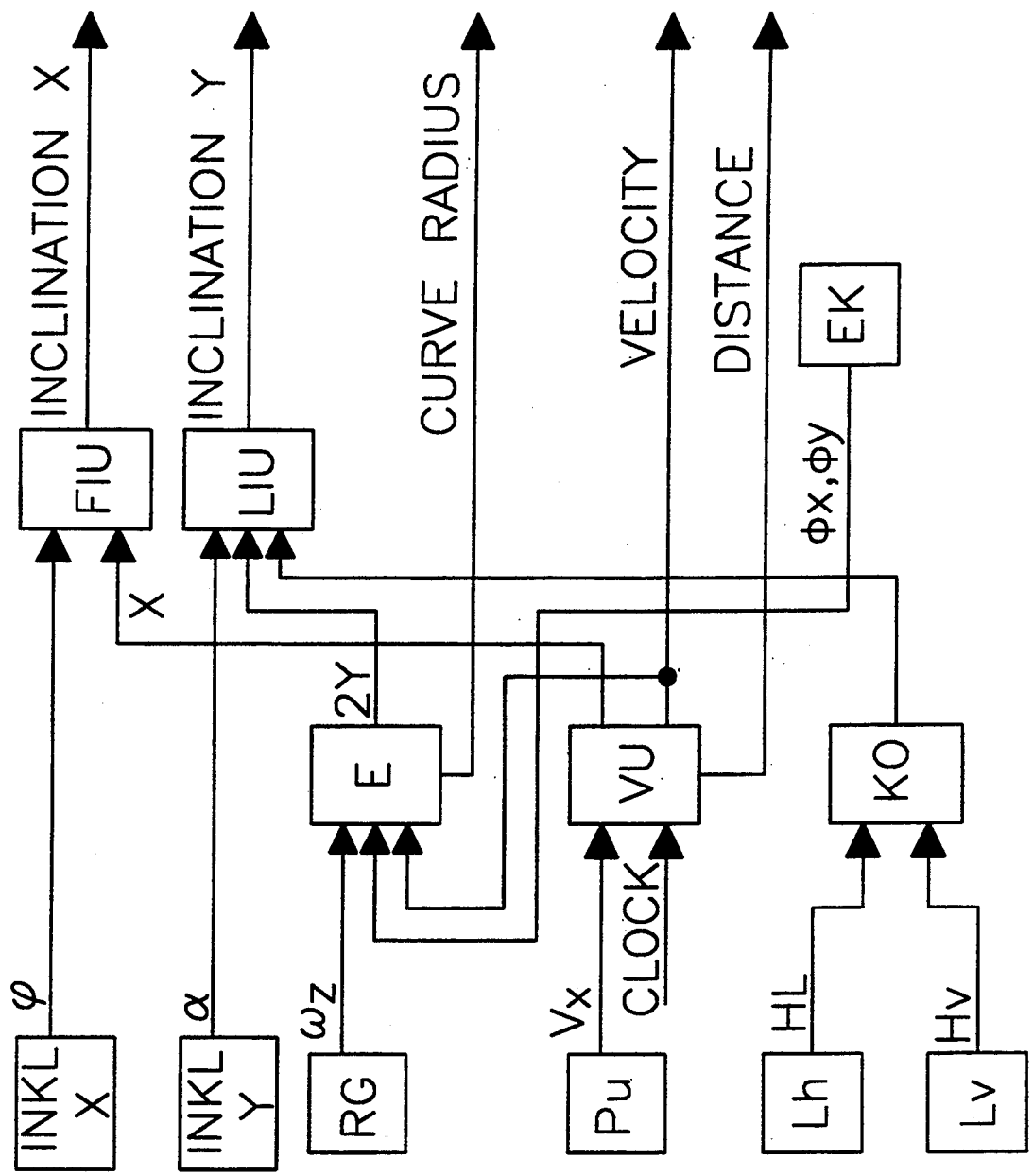
FIG. 3 is a basic block diagram of an analyzing unit for measuring a roadway.

The values obtained are processed in a device in accordance with the basic block diagram shown in FIG. 3 The inclinometer X for measuring the direction of travel provides a measured value $\phi$, which is transmitted to a forward inclination unit FIU where the measured value is corrected for forwardly-directed acceleration or deceleration $a_x$, and the unit FIU, and supplies a value for the inclination X in the direction of travel. The other inclinometer Y produces a measured value α, which is corrected by the lateral acceleration $a_y$, and emits an output signal transmitted to a lateral-inclination unit LIU. This unit is also supplied with the measured values Hh Hv from the laser ranging units Lh and Lv to the right and to the left, via a comparator KO. A third input signal is transmitted to the lateral-inclination unit LIU from an electronic unit E which in turn emits a value for the curve radius to which three inputs are connected the rate gyro RG, the compass EK, as well as one output of a velocity unit Vu, to which two inputs are connected to the pulse transducer Pu and to a clock signal CLOCK, respectively, and which also emits an output signal to a velocity indicator and an odometer.

The method and the apparatus according to the invention make it possible to determine the accelerations affecting the inclinometers, and if the relationship acceleration/inclinometer deflection is known, a correction can be performed so that the signal caused by the inclination relative to the horizontal plane can be obtained in corrected form.

The system according to the invention is highly profitable in road measuring contexts, not only by providing more information on any road maintenance required, but also by enabling monitoring newly-built road surfaces and by providing basic data for contracts in connection with the planning and the construction of roads. With the invention, roads can be regularly measured at velocities adaptable to the prevailing traffic pace. Thus, measurements can be carried out also at motorway speeds, involving minimum traffic hazards and environmental problems, as well as optimum durability. In addition, the system according to the invention is maintenance-friendly.

We claim:

1. Method for measuring the curvature and the slope of ground surfaces in two different directions, in and transversely of the direction of travel, by means of a drivable, slope-sensitive unit which emits electric signals relating to the crossfall, the hilliness, and the horizontal curvature, using a first electronic angle sensor in one direction corresponding to the direction of travel and a second electronic angle sensor in a direction transverse to the one direction for measuring the angle relative to a horizontal plane (HP), and an angular-velocity gyro with its measuring direction in a vertical direction in relation to the direction of travel and the transverse direction for providing a signal representing lateral acceleration, the method comprising the steps of:
   measuring a first inclination in the direction of travel of the drivable unit using the first electronic angle sensor, and measuring a second inclination in the transverse direction to the direction of travel using the second electronic angle sensor;
   measuring lateral acceleration in the transverse direction using an output of the angular-velocity gyro and the velocity of the drivable unit;
   determining the acceleration/deceleration in the direction of travel of the drivable unit by using a pulse means provided in a nondriving wheel of the drivable unit and by an analyzing unit for determining distance of travel, and for determining velocity and acceleration on the basis of clock inputs;
   measuring the relative inclination of the drivable unit relative to at least one of a plane through its ruts and the plane of the roadway by laser ranging units for correcting for swaying of the vehicle to correct for crossfall;
   correcting the measured first inclination using the acceleration/deceleration in the direction of travel to provide the curvature and slope in the direction of travel;
   correcting the measured second inclination using the measured lateral acceleration and the measured relative inclination; and
   continuously zero-point monitoring and calibrating the angular-velocity gyro using means for monitoring and calibrating including a compass.

2. The method of claim 1, wherein the compass is an electronic compass, and the method further comprises a step of using an electronic output of the electronic compass during the step of zero-point monitoring and calibrating.

3. The method of claim 1 further comprising the steps of deriving a first mean value from the measured values emitted by the angular-velocity gyro during a certain period of time, deriving a second mean value from the measured values provided by the compass during the same period of time, and comparing these mean values, and using the difference for correction purposes.

4. The method of claim 1, further comprising a step of compensating the measured values of the compass for local magnetic deviation.

5. Apparatus for measuring the curvature and the slope of ground surfaces in two different directions by means of a drivable slope-sensitive unit which emits measured values relating to the crossfall, the hilliness, the horizontal curvature, and at least one of the covered distance by the drivable unit and the velocity thereof, the apparatus comprising two electronic angle sensors for measuring the inclination of the drivable unit in and transversely of the direction of travel, and an angular-velocity gyro with its measuring direction in the vertical direction for measuring the angular velocity of the drivable unit,
   a pulse means provided in a nondriving wheel of the drivable unit for emitting a certain number of pulses per revolution of the wheel;
   means for determining a velocity and an acceleration of the drivable unit in the direction of travel;
   laser ranging units for measuring the distance to the ground surface in at least one of the ruts of the ground surfaces and locations of the ground surfaces outside of the ruts to measure relative inclination;
   a compass for measuring angular direction of the drivable unit and means for continuous zero-point monitoring and calibration of the angular-velocity gyro using the output of the compass; and
   means for correcting the measured inclination in the direction of travel by use of the determined acceleration, and for correcting the measured inclination in the transverse direction by use of the velocity, angular velocity, and the distances to the ground surface.

6. The apparatus of claim 5 wherein the compass comprises an electric compass.

7. The apparatus of claim 5 further comprising first and second laser ranging units (L, L) provided to the right of the right-hand rut and to the left of the left-hand rut, respectively, for measuring the distance to the road surface.

8. The apparatus of claim 5 further comprising an electric unit with inputs for the output signal of the angular-velocity gyro, the output signal of the electronic compass, and the output signal of a velocity transducer.

9. The apparatus of claim 8, further comprising a lateral-inclination unit which emits a value (Y) for the crossfall of the roadway and has inputs for the output signal of a transverse-inclination inclinometer, the output signal of the electronic unit, and the laser ranging unit output signals that have been compared with one another in a comparator.

10. The apparatus of claim 5, further comprising a first mean-value computing device for the measured values provided by the rate gyro during a certain period of time, a second mean-value computing device for the measured values provided by the compass during the same period of time, and a comparator for these mean values.

* * * * *

UNITED STATES PATENT AND TRADEMARK OFFICE
CERTIFICATE OF CORRECTION

PATENT NO. : 5,440,923
DATED : August 15, 1995
INVENTOR(S) : Peter W. Arnberg; Roland Östergren It is certified that error appears in the above-indentified patent and that said Letters Patent is hereby corrected as shown below:

On the Title Page, Item [22], delete "Filed: Jun. 10, 1993" and insert therefor

|  |  |  |
|---|---|---|
| [22] | PCT Filed: | Dec. 11, 1991 |
| [86] | PCT No.: | PCT/SE91/00853 |
|  | § 371 Date: | Jun. 10, 1993 |
|  | § 102(e) Date: | Jun. 10, 1993 |
| [87] | PCT Pub. No. : | WO92/10720 |
|  | PCT Pub. Date: | Jun. 25, 1992 |

Column 1, line 40, change "Pat" to "Pat."
Column 2, line 9, before "complicated" insert a comma.
Column 2, line 48, change "X Y" to -- X-Y --.
Column 2, line 61, change "$\alpha=\gamma+k \cdot H\ V$" to -- $\alpha=\gamma+k \cdot a_y$ --.
Column 4, line 4, change "Figure" to -- figure --.
Column 4, line 4, delete the comma after "middle".
Column 4, lines 10,11, change "relative to the direction HP (FIG. 2)" to -- relative to the horizontal plane HP (FIG. 2), --.
Column 4, lines 11,12, after "inclination" insert -- of --.
Column 4, line 17, after "inclination" delete "nation".
Column 4, line 28, change "BY" to -- By --.
Column 4, line 52, change "covered i.e." to -- covered, i.e., --.
Column 4, line 64, after "3" insert a period.
Column 5, line 6, change "Hh Hv" to -- Hh, Hv --.
Column 5, line 7, after "left," insert -- respectively, --.

UNITED STATES PATENT AND TRADEMARK OFFICE
CERTIFICATE OF CORRECTION

PATENT NO. : 5,440,923
DATED : August 15, 1995
INVENTOR(S) : Peter W. Arnberg; Roland Östergren It is certified that error appears in the above-indentified patent and that said Letters Patent is hereby corrected as shown below:

Column 6, line 63, change "(L, L)" to -- (Lv, Lh) --.
Column 6, line 68, change "electric" to -- electronic --.
Column 7, lines 2,3, delete "electronic".

Signed and Sealed this

Eighteenth Day of June, 1996

Attest:

BRUCE LEHMAN

Attesting Officer

Commissioner of Patents and Trademarks